(12) United States Patent
Chen et al.

(10) Patent No.: US 12,461,297 B2
(45) Date of Patent: Nov. 4, 2025

(54) ONE-WAY CIRCULARLY POLARIZED LIGHT GENERATED BY PROPAGATION THROUGH CH-GLC FILMS DOPED WITH LIGHT-ABSORBING DYES

(71) Applicant: University of Rochester, Rochester, NY (US)

(72) Inventors: Shaw Chen, Rochester, NY (US); Mitchell Anthamatten, Rochester, NY (US); Jane Ou, Rochester, NY (US)

(73) Assignee: University of Rochester, Rochester, NY (US)

( * ) Notice: Subject to any disclaimer, the term of this patent is extended or adjusted under 35 U.S.C. 154(b) by 707 days.

(21) Appl. No.: 17/581,124

(22) Filed: Jan. 21, 2022

(65) Prior Publication Data

US 2022/0268982 A1     Aug. 25, 2022

Related U.S. Application Data

(60) Provisional application No. 63/151,410, filed on Feb. 19, 2021.

(51) Int. Cl.
| | | |
|---|---|---|
| *G02B 5/30* | (2006.01) | |
| *C09B 1/42* | (2006.01) | |
| *C09B 1/503* | (2006.01) | |
| *C09K 19/36* | (2006.01) | |
| *C09K 19/60* | (2006.01) | |
| *G02B 1/11* | (2015.01) | |
| *G02B 5/00* | (2006.01) | |

(52) U.S. Cl.
CPC .............. *G02B 5/3025* (2013.01); *C09B 1/42* (2013.01); *C09B 1/5035* (2013.01); *C09K 19/36* (2013.01); *C09K 19/603* (2013.01); *G02B 1/11* (2013.01); *G02B 5/003* (2013.01); *G02B 5/3016* (2013.01)

(58) Field of Classification Search
None
See application file for complete search history.

(56) References Cited

U.S. PATENT DOCUMENTS

| | | | |
|---|---|---|---|
| 7,001,648 B2 | 2/2006 | Chen | |
| 2005/0263741 A1* | 12/2005 | Chen | C09K 19/322 252/299.65 |
| 2013/0107176 A1* | 5/2013 | Van Oosten | G02F 1/13725 349/96 |
| 2014/0168595 A1* | 6/2014 | Kim | C09K 19/44 349/182 |

OTHER PUBLICATIONS

Ou, J.; Chen, S., Simulation of Circular Dichroism by Chromophores Couples with Selective Reflection by Cholesteric Stacks, J. Phys. Chem. B 2020, 124, 679-683.
Sackmann, E.; Voss, J., Circular Dichroism of Helically Arranged Molecules in Cholesteric Phases, Chem. Phys. Lett. 1972, 14, 528-532.
Umanskii BA, Simkyankin IV, Circular Dichroism in Cholesteric Liquid Crystals, ISSN 1063-7745, Crystallography Reports, 2019, vol. 64, No. 3, pp. 437-442. © Pleiades Publishing, Inc., 2019.

* cited by examiner

*Primary Examiner* — Anthony J Frost
(74) *Attorney, Agent, or Firm* — Wissing Miller LLP

(57) ABSTRACT

An optical system that includes a cholesteric glassy liquid crystal film doped with a dye and configured to preferentially absorb light of a first handedness, such as left-hand circularly polarized (LCP) light, but pass light of the opposite handedness, such a right-hand circularly polarized (RCP) light. Adding an anti-reflection coating can further increase the transmission-to-reflection ratio.

26 Claims, 8 Drawing Sheets

1. $T_R$ and $T_L$ represent the transmittance of the RCP and LCP component, respectively.
2. Effects of optical constants on isolation ratio to be quantified experimentally or computationally

Cholesteric Glassy Liquid Crystals as Host Films

ONE EXAMPLE EACH, POSITIVE AND NEGATIVE LINEAR DICHROIC DYES

ONE-WAY CIRCULARLY POLARIZED LIGHT GENERATED BY PROPAGATION THROUGH CH-GLC FILMS DOPED WITH LIGHT-ABSORBING DYES

FIELD

This patent specification relates to optical devices and, in one example, to one-way night vision technology for observing low light environment without being seen.

BACKGROUND AND SUMMARY

Human vision in low-light environments can be assisted with night-vision devices. One issue with such devices is that light reaches a sensor or the human eye tend to reflect some of the incident light and thus enable adversaries to detect the presence and location of observers. Anti-reflection coatings are used to reduce reflection but can only succeed to some degree.

This patent specification is directed to novel approaches that further increase the transmission-to-reflection ratio of night-vision or other optical devices and thus reduce the reflected light and assist in protecting the device from detection. In the case of a night-vision system that receives unpolarized light beam from adversaries, a cholesteric liquid crystal film can be employed with a stopband where the incident light is resolved into forward and backward circularly polarized intensities. Transmitted (forward) light reaches a sensitive detector or the observer's eye to locate or identify adversaries but reflected (backward) light is reduced to avoid disclosing the location of the night-vision system. Thus, one-way circularly polarized light can be beneficial for night vision to take advantage of adversaries' light source or ambient light to increase the transmission-to-reflection ratio, i.e., the isolation ratio. This patent specification describes examples of two novel approaches in which unpolarized incident light impinges on a film such as a cholesteric glassy liquid crystal (Ch-GLC) film or layer(s).

In the examples provided here, the incident light passes through a Ch-GLC film that is doped with an absorbing dye. The doped Ch-GLC layer contain two types of spectral bands that reduce the transmission of light. Within the spectral range of the Ch-GLC layer's stopband, circularly polarized light of the same handedness as that of the host film is prohibited to pass through the device due to the Ch-GLC's periodic structure, resulting in reflection of incident light. Within the spectral range of the absorption band, the reflected circularly polarized light is absorbed into the doped dye's electronic structure. In a first example, the film's stopband overlaps with the dye's absorption band, and in a second example the stopband and absorption bands are separate and do not overlap. Antireflection coatings on substrate surfaces can be applied to further enhance isolation ratios in both examples.

In the first example (FIG. 1), containing a dye with a negative or positive linear dichroism, LD, the absorption band and the stopband overlap in their spectral range, and the device structure preferentially absorbs incident light circularly polarized in one direction, for example left-hand circularly polarized (LCP) light, and passes light that overlaps in frequency with the absorbed light but has opposite handedness, e.g., the device passes right-hand polarized (RCP) light. As a result, the light reaching the sensor of the night-vision device is primarily RCP. Any transmitted RCP reverses handedness upon reflection from a sensor and cannot transmit across the device because of the stopband.

Similar in device structure to the first example, the device structure in the second example (FIG. 2) permits the transmitted RCP to be reflected from the sensor as LCP to be preferentially absorbed upon propagation through the dye-doped LH-CLC film. In either example, adding an anti-reflection coating on optical components can further assist in increasing the transmission-to-reflection ratio.

One utility of the novel technology discussed in this patent specification can be to improve night-vision devices such as scopes and cameras, but it can be employed in other devices as well where reflected light is undesirable for day-time optical devices.

According to some embodiments, an optical device comprises a cholesteric glassy liquid crystal film doped with a dye, wherein said film (a) preferentially absorbs a forward component of light incident on the film that is circularly polarized with handedness in a first direction as well as any backward component of the incident light that is circularly polarized with handedness in said first direction and has been reflected after passage through the doped film; and (b) preferentially passes a forward component of the incident light that is circularly polarized with handedness in a second direction different from the first direction.

The optical device can include one or more of the following features: (a) the film has absorption and stop band ranges that overlap in wavelength; (b) the film is doped with a positive or negative dichroic dye; (c) the device further includes an anti-reflective coating configured to further reduce reflected light; (d) an isolation ratio of the optical device is in a range of 10 to 500; (e) the film has absorption and stop band ranges spaced from each other in wavelength; (f) the absorption band of the film is at a shorter wavelength range than the stop band; (g) the absorption band of the film is at a longer wavelength range than the stop band; (h) the film comprises a monodomain cholesteric liquid crystal; (i) the device further includes a receiving surface at a first side of said film, receiving light passed by said film, wherein said film preferentially absorbs light reflected by said first surface that is circularly polarized with handedness in said first direction; (i) the film has absorption and stop band ranges that overlap in wavelength: (j) the film is doped with a linear dichroic dye represented by

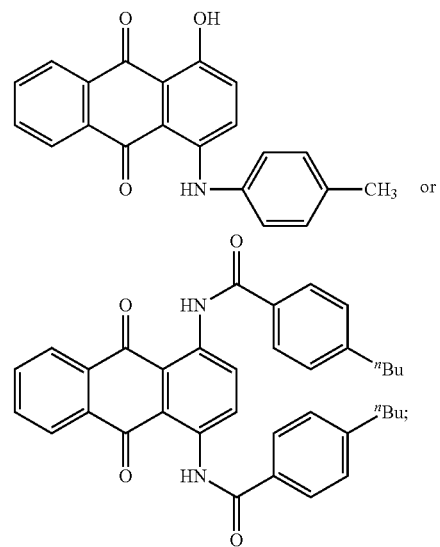

and (k) the liquid crystal film comprises a glassy chiral-nematic liquid crystal composition comprising a compound having a 1,3,5-benzenetricarbonyl central moiety, said composition being characterized by a morphologically stable cholesteric phase and said compound having the structural formula

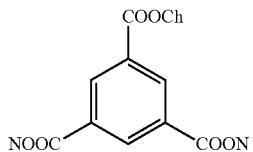

wherein each N represents a nematic group connected to said central moiety by a carboxylic ester linkage and Ch represents a chiral group connected to said central moiety by a carboxylic ester linkage, and variations thereof are identified in the claims of the patent and the remainder of the patent specification.

DETAILED DESCRIPTION

A detailed description of examples of preferred embodiments is provided below. While several embodiments are described, the new subject matter described in this patent specification is not limited to any one embodiment or combination of embodiments described herein, but instead encompasses numerous alternatives, modifications, and equivalents. In addition, while numerous specific details are set forth in the following description to provide a thorough understanding, some embodiments can be practiced without some or all these details. Moreover, for the purpose of clarity, certain technical material that is known in the related art has not been described in detail to avoid unnecessarily obscuring the new subject matter described herein. Individual features of one or several of the specific embodiments described herein can be used in combination with features of other described embodiments or with other features.

Figure 1:
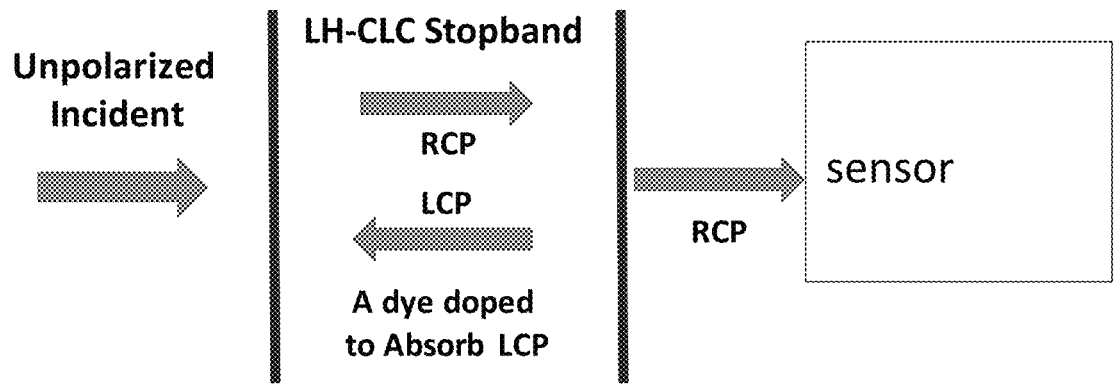
FIG. 1 illustrates a first example of a night-vision system in which unpolarized incident light impinges on a Ch-CLC film that is dye-doped to pass RCP light but absorb LCP light.

FIG. 1 illustrates schematically a first example of a night-vision system in which unpolarized incident light impinges on a Ch-GLC film that is dye-doped to pass RCP but absorb LCP light. The film labeled LH-CLC Stopband passes forward RCP light to the sensor of the night-vision system but absorbs most of the forward LCP light. In addition, the film absorbs backward LCP light that may have reached the sensor optics to be reflected thereby.

The unpolarized incident light can be treated as the sum of RCP and LCP of equal intensities. Composite circular dichroism (CD) is characterized by quantifying respective absorbances over incremental wavelengths across incident light undergoing selective reflection and absorption through a transparent cholesteric liquid crystal (CLC) film. White light impinges on a dye-doped, transparent CLC film to induce a preferential isolation ratio $I_T/I_R$, where subscripts T and R denote transmitted and reflected light intensity, respectively. The dye preferentially absorbs reflected circularly polarized (CP) light. For discussion of a pertinent theory, see Ou, J.; Chen, S., Simulation of Circular Dichroism by Chromophores Couples with Selective Reflection by Cholesteric Stacks, J. Phys. Chem. B 2020, 124, 679-683, which is hereby incorporated by reference.

Cholesteric Glassy Liquid Crystals (Ch-GLC) comprise a planar, helical stack of quasi-nematic layers of rigid rods and have a tunable stopband from visible to near IR region by mixing enantiomeric Ch-GLCs to thereby create LCP and RCP components. The film can be tuned for selected optical spectra and can have a thickness from tens of nanometers to microns and inherent selective wavelength range reflection. Both preferential absorption and preferential reflection are incorporated.

Figure 2:
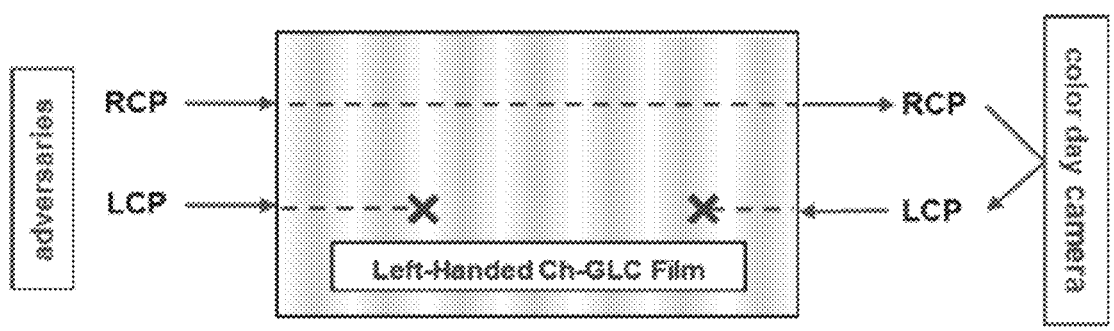
FIG. 2 is a schematic illustration of a night-vision system in which a Ch-GLC film is between a source of incident light, for example from adversaries, and a sensor such as a color day camera.

FIG. 2 is a schematic illustration of a night-vision system in which the incident light source is labeled "Adversaries" and the sensor on the other side of a Ch-GLC film is labeled "Color day camera". The Ch-GLC film in this example is a left-handed Ch-GLC film. With an LD<0 doped dye, the film is expected to preferentially absorb a left-handed circularly polarized component, allowing a right-handed component to propagate through as an RCP light source. Alternatively, doping an LD>0 dye while exchanging spectral positions of a host film's stopband and dye's absorption band will also result in an RCP light source.

Composite circular dichroism (CD) can be represented by expression 1 below, where $T_{RCP}$ and $T_{LCP}$ are the transmittance for the right circularly polarized component and the left circularly polarized component, respectively:

$$CD=[T_{RCP}-T_{LCP}]/[T_{RCP}+T_{LCP}+2(T_{RCP}+T_{LCP})^{1/2}]$$ [1]

See Sackmann, E.; Voss, J., Circular Dichroism of Helically Arranged Molecules in Cholesteric Phases, Chem. Phys. Lett. 1972, 14, 528-532, which is hereby incorporated by reference.

Alternatively, CD can be represented by expression 2:

$$CD=[T_{LCP}-T_{RCP}]/[T_{LCP}+T_{RCP}]$$ [2]

See Umanskii B A, Simkyankin I V, Circular Dichroism in Cholesteric Liquid Crystals, ISSN 1063-7745, Crystallography Reports, 2019, Vol. 64, No. 3, pp. 437-442. © Pleiades Publishing, Inc., 2019; Russian Text © The Author(s), 2019, published in Kristallografiya, 2019, Vol. 64, No. 3, pp. 412-418.

The CDs according to these expressions 1 and 2 have opposite signs under the same conditions, corresponding to the same preferential absorption of circularly polarized component.

Based on the definitions of absorbance, A, and transmittance, T, these parameters are related according to expression 3:

$$A_{LCP}-A_{RCP}=\text{Log}[T_{RCP}/T_{LCP}]$$ [3]

If $$CD=[T_{LCP}-T_{RCP}]/[T_{LCP}+T_{RCP}],$$ [4]

and $$LD=[K_{II}-K_{I}]/[K_{II}+K_{I}]$$ [5]

where T and K represent transmittance and absorption coefficient, respectively, and the parameters governing the isolation ratio can be identified as: CLC host film's handedness and thickness, values of the CLC film's optical constants, the sign of doped dye's LD and its doping level, and dye's absorption band relative to host film's stop-band including overlapping bands.

In general, a theory explained in Ou and Chen JPCB 2020, fully cited above, assists in computing the isolation ratio by incorporating both preferential absorption and preferential reflection covering the parameter space identified above.

Figure 3:
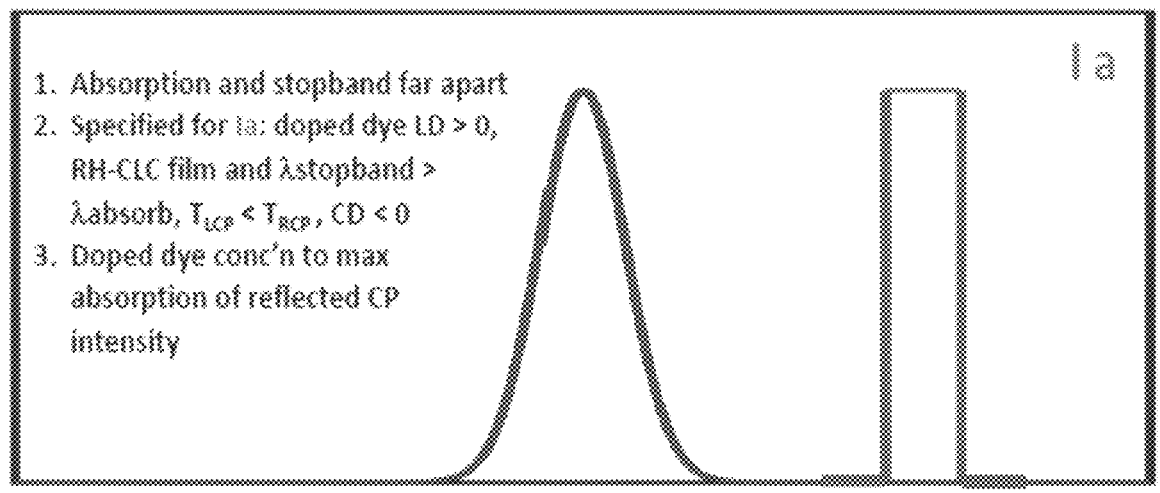
FIGS. 3 and 4 illustrate a second example of technology for optimizing the transmission-to-reflection ratio in optical systems employing special films and layers between a sensor and a source of white ambient light for example from adversaries.
Figure 4:
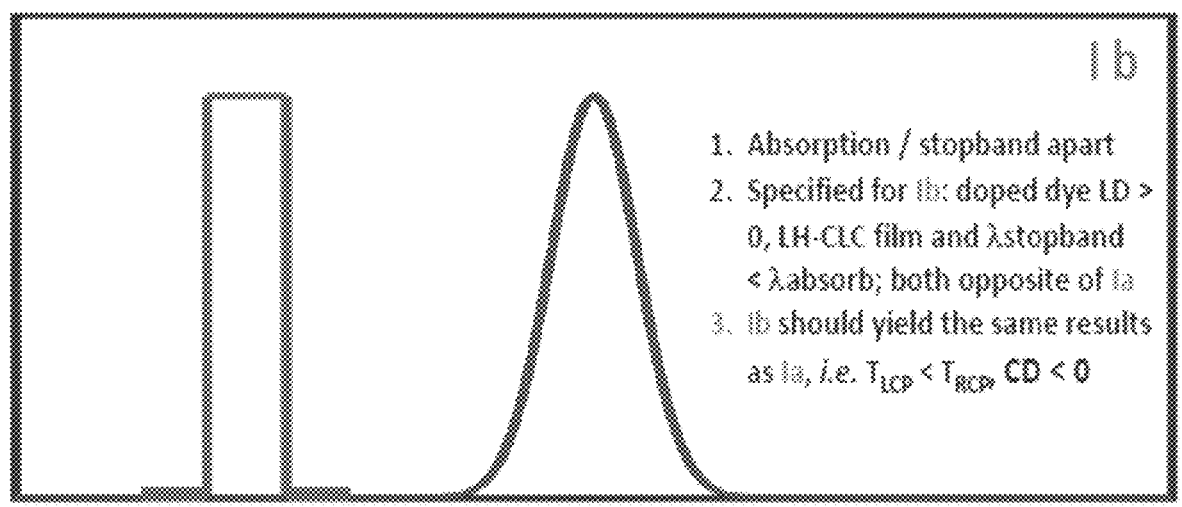

FIGS. 3 and 4 illustrate a second example of the new technology for optimizing the transmission-to-reflection ratio in optical systems employing special films or layers between a sensor and a source of white ambient light. The physical arrangement of the sensor, film and source of ambient light (adversary) is like FIGS. 1 and 2 but the mechanism for increasing the transmission-to-reflection ratio of the optical system is different.

In FIG. 3, the absorption and stop band of the film are apart in frequency (wavelength). The film includes doping with dye where for a right-handed CLC film LD>0 and the wavelength λ for the stopband is greater than that for the absorption band, $\lambda_{LCP}<\lambda_{RCP}$, CD<0, and the doped dye concentration is adjusted to maximize absorption of reflected CP intensity to the extent practicable. As seen in FIG. 3, the bell-shaped curve that represents absorption is at a lower wavelength range than the π-shaped curve that represents wavelength range of the stop band (the horizontal axis is wavelength).

The stop band illustrated in FIG. 3 acts on the absorption spectrum furnished by the doped dye upon irradiation with white light to achieve preferential absorption of one of the circularly polarized components, leaving circularly polarized components of opposite handedness to be transmitted to the sensor without attenuation.

FIG. 4 illustrates opposite handedness to that of FIG. 3. In FIG. 4, the spectral positions of the absorption and stopgap are reversed compared to FIG. 3, yelding the same-handed circularly polarized light reaching the sensor.

Figure 5:
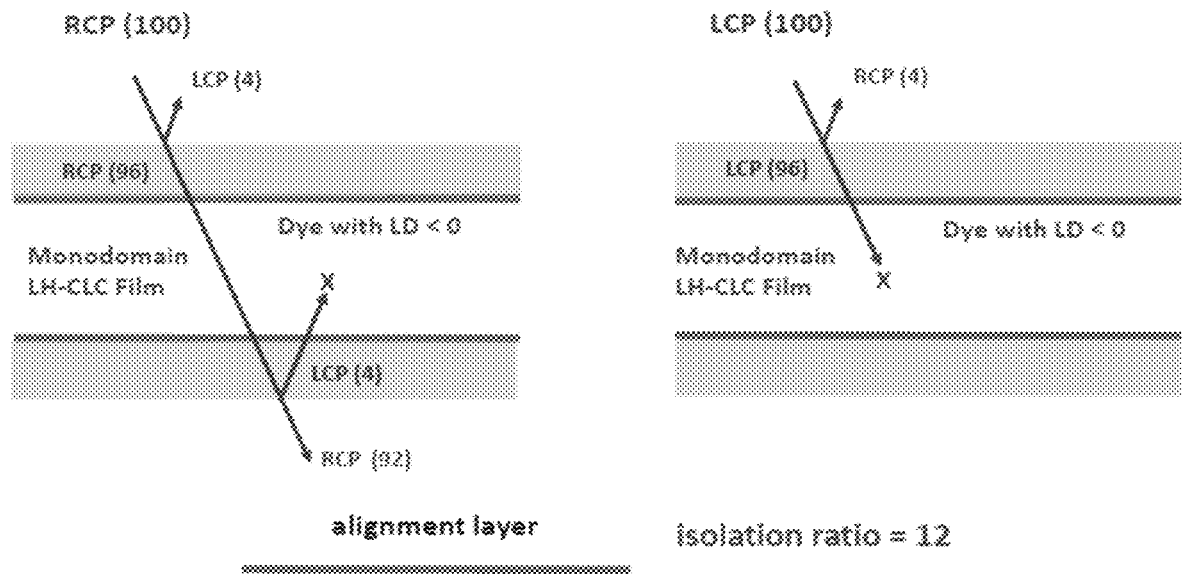
FIG. 5 is a numerical and graphic illustration of an optical system with a 4% reflectivity at a glass-air interface without anti-reflective coating, offering a base isolation ratio of 12 through preferential absorption of LCP by an LD<0 dye.

FIG. 5 is a numerical and graphic illustration of an optical system with a 4% reflectivity at a glass-air interface without anti-reflective coating, offering a base isolation ratio of 12 through preferential absorption of LCP by an LD<0 dye.

FIG. 5 shows at left white light irradiating a dye film formed over an alignment layer (solid line), where the dye is characterized by LD<0 and transmits 96 units of the 100 units RCP light and refects 4 units LCP light. The transmitted portions of light irradiate a monodomain LH-CLC film formed under an alignment layer (solid line), which film transmits 92 units of RCP light and reflects 4 units of LCP light. The RCP light reflected by the Ch-GLC film is further attenuated by passage, as baclward light, through the dye layer.

FIG. 5 shows at right that the dye layer is configured to absorb the LCP light and to reflect 4 units of the RCP light. In the arrangement of FIG. 5, the isolation ratio is 12.

Figure 6:
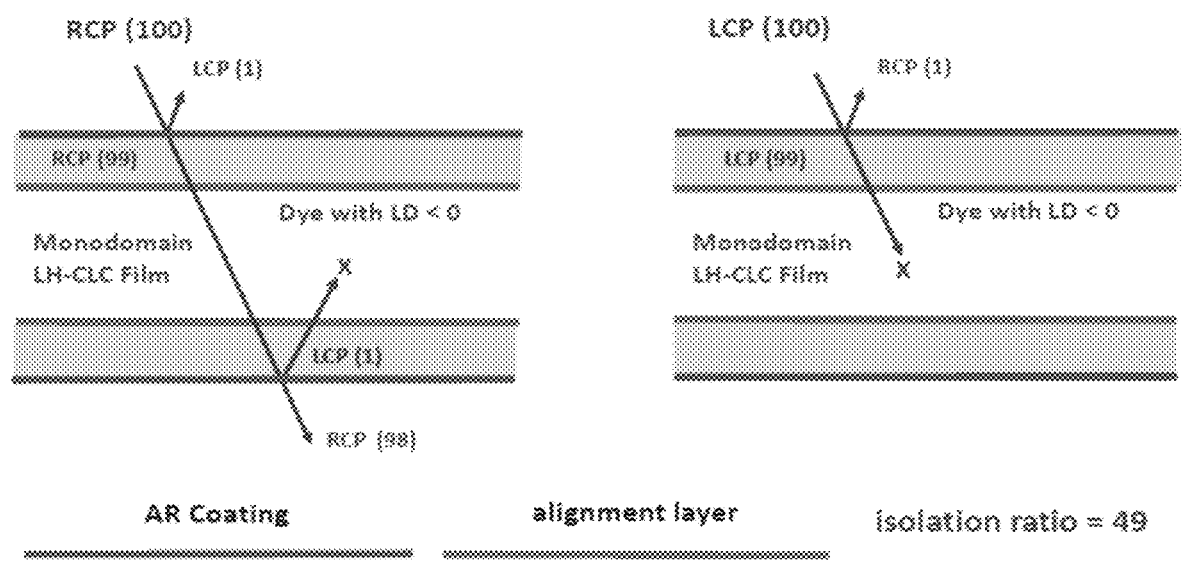
FIG. 6 is a numerical and graphic illustration of an optical system like FIG. 5 but with an anti-reflective coating with a 1% reflectivity at a glass-air interface, offering an isolation ratio of 49 through preferential absorption of LCP by an LD<0 dye.

FIG. 6 is a numerical and graphic illustration of an optical system that is like FIG. 5 but adds an anti-reflective coating over the dye layer (solid line) and under the Ch-CLC film (solid line). The anti-reflective coating reduces the reflectivity at the glass-air interface to 1% thereby boosting the isolation ratio acheved through preferential absorption of circularly polarized light by the LH-GLC film.

FIG. 6 illustrates at left an example where the dye layer passes 99 out of 100 units of RCP light and reflects 1 unit of LCP light, and the Ch-GLC film passes 98 unit of RCP light. At right, FIG. 6 shows that the dye layer absorbs the LCP light and reflects 1 unit of RCP light. The isolation ratio in this example is 49.

Figure 7:
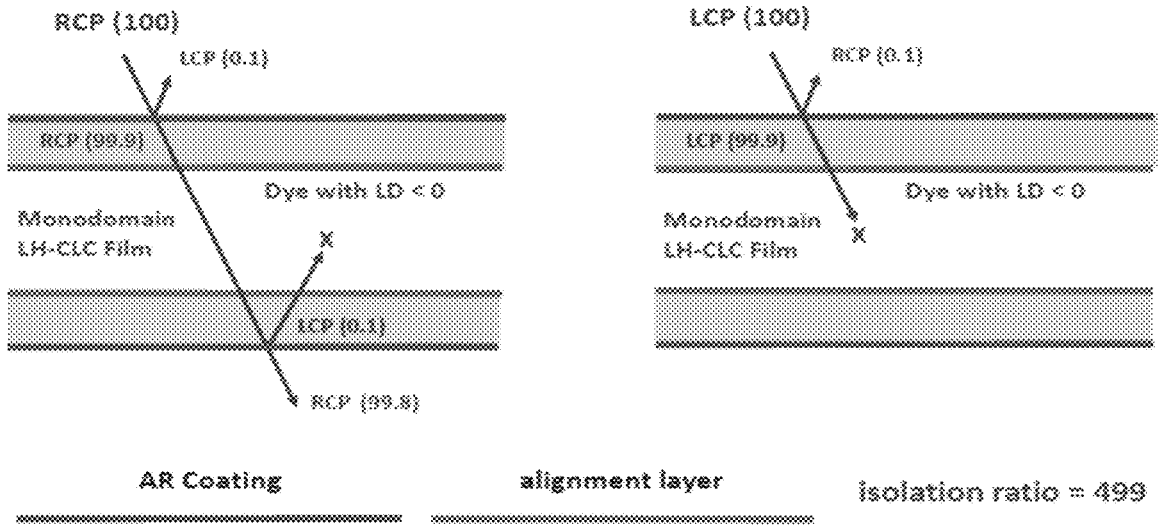
FIG. 7 is otherwise like FIG. 6 but illustrates an example in which the anti-reflective coating reduces reflectivity to 0.1% at the air-glass interface, thereby boosting the isolation ratio to 499 with preferential absorption by an LD<0 dye or by an LD>0 dye while exchanging spectral positions of the host film's stopband and the dye absorption band.

FIG. 7 is otherwise like FIG. 6 but illustrates an example in which the anti-reflective coating reduces reflectivity to 0.1% at the air-glass interface thereby boosting the isolation ratio with preferential absorption by an LD<0 dye layer or by an LD>0 dye layer while exchanging spectral positions of the host film's stopband and the dye absorption band. In the case of LD<0, FIG. 7 shows at left that 99.9 units of RCP light passes through the dye layer and 0.1 units of the LCP light are reflected, and 99.8 unit of the RCP light then pass through the Lh-CLC film. At right, FIG. 7 shows that the dye layer absorbs the LCP light. The isolation ratio in this example is 499.

Figure 8:
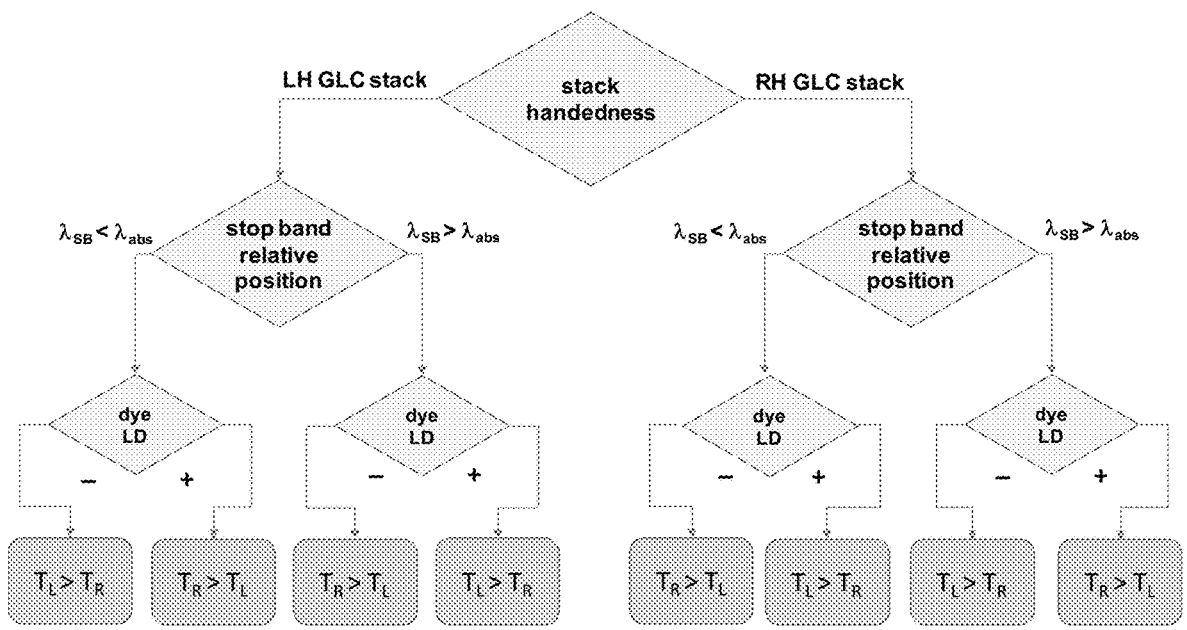
FIG. 8 illustrates devices that separate a guest's absorption band and a host's stop band of materials suitable for use in the examples described in this patent specification.

FIG. 8 illustrates devices that separate a guest's absorption band and a host's stop band of materials suitable for use in the examples described in this patent specification. As illustrated in FIG. 8, if RH GLC stack handedness is selected, two kinds of stop band relative position can then be selected for stop band and absorption band frequency ranges of light. Each choice of stop band relative position allows for selecting a dye LD to determine which of the RCP and LCP components will have greater intensity. If RH GLC stack is selected, again a further selection of stop band relative position and then dye LD allows for resulting choice of which of the RCP and LCP components with have greater intensity. As noted in FIG. 8, the effects of optical constants on the isolation ratio can be quantified experimentally or can be quantified computationally (per theory discussed in the material incorporated by reference herein).

Figure 9:
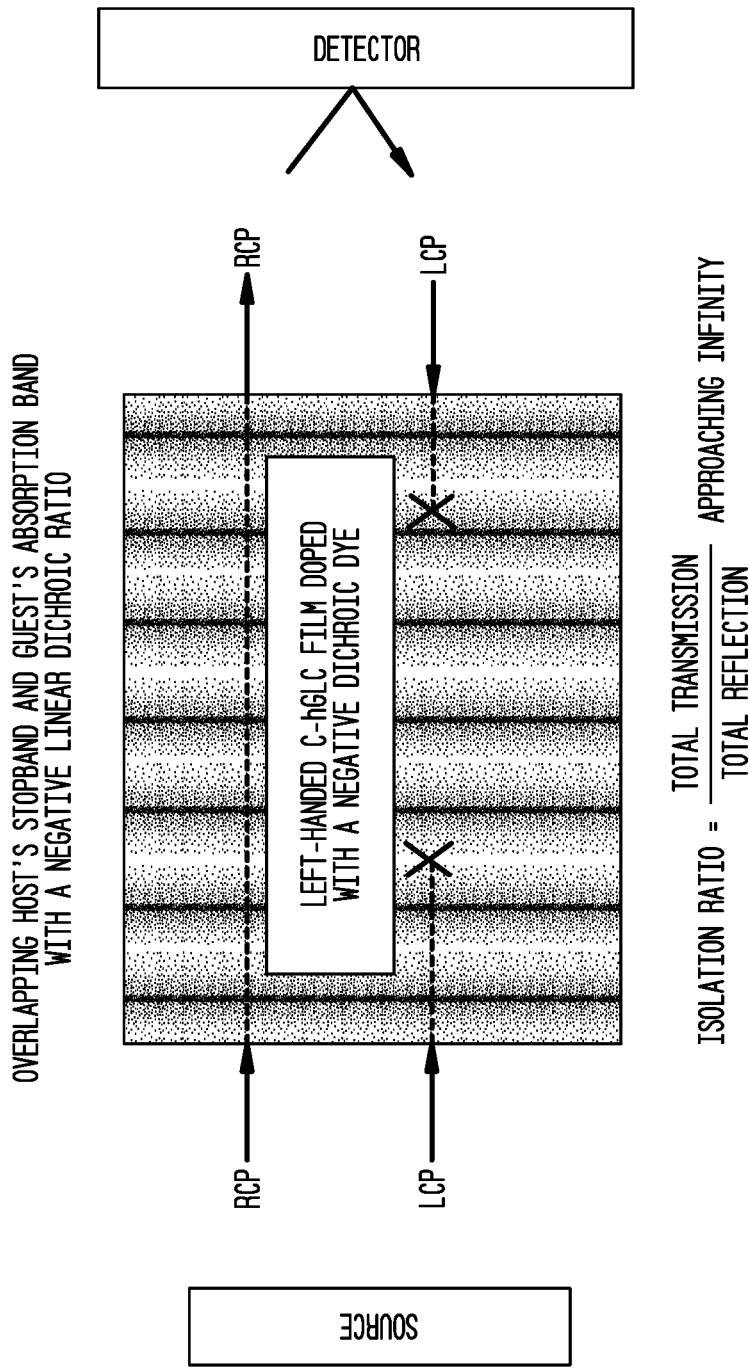
FIG. 9 is a schematic illustration of a doped left-handed Ch-GLC film with overlapping host's stopband and guest's absorption band with a negative linear dichroic ratio.

FIG. 9 similar to FIG. 2 discussed above and illustrates light propagation through a left-handed CH-GLC film doped with a dye having a negative linear dichroic ratio. Light from a source (e.g., an adversary) includes a right circularly polarized component RCP and a left circularly polarized component LCP both incident on a left side of the film. The RCP component passes in a forward direction (left to right) through the film but the doped film attenuates the LCP component in the forward direction and any LCP component that enters the doped film in the backward direction (right to left), for example any incident RCP that has reached a detector such as a camera and is reflected as LCP thereby. In the example of FIG. 9, the host and guest absorption bands overlap. The isolation ratio, defined as total transmission of light through the doped film divided by total reflection from the film can approach infinity. Selective reflection by the host's helical stacks and selective absorption by the dichroic absorber as a guest act constructively to boost the isolation ratio. As in the case of FIG. 2, an antireflection layer can be added to the doped film.

Figure 10:
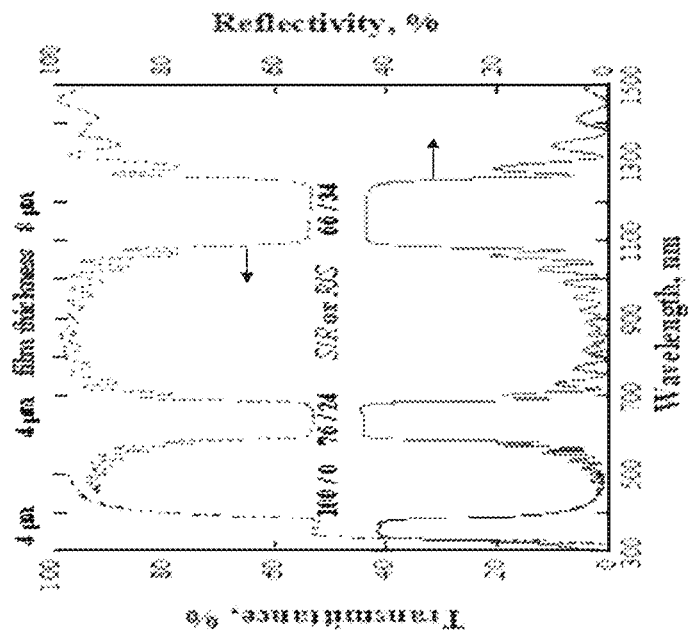
FIG. 10 illustrates cholesteric glassy liquid crystal examples as host films and graphs relating transmittance %, wavelength and reflectivity % for such examples.
Figure 10:
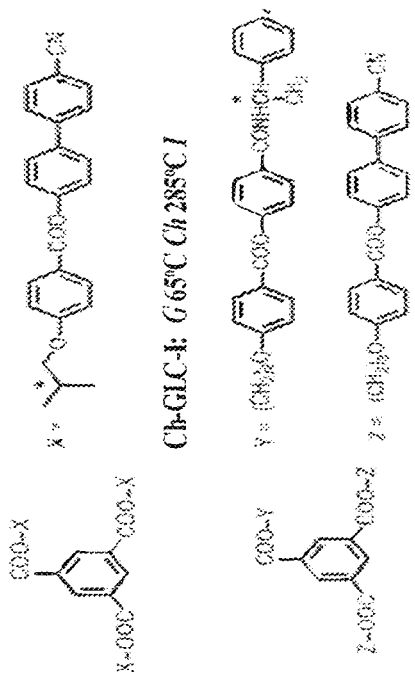

FIG. 10 illustrates examples of cholesteric glassy liquid crystals as host film in optical devices as in FIG. 9 for example, and further illustrates graphs of transmittance and reflectivity vs. wavelength of light. The left side of FIG. 10 shows two examples of Gh-GLC films and the right side shows graphs of their response to light. The solid line graphs show reflectivity in % shown at the right vertical scale for the wavelengths shown in the bottom horizontal scale. The broken line graphs show transmittance % relative to the left vertical scale. The top horizontal scale shows thickness of the doped film. Several ratios of LCP/RCP components are illustrated: 100/0, 76/24, and 66/34.

Figure 11:
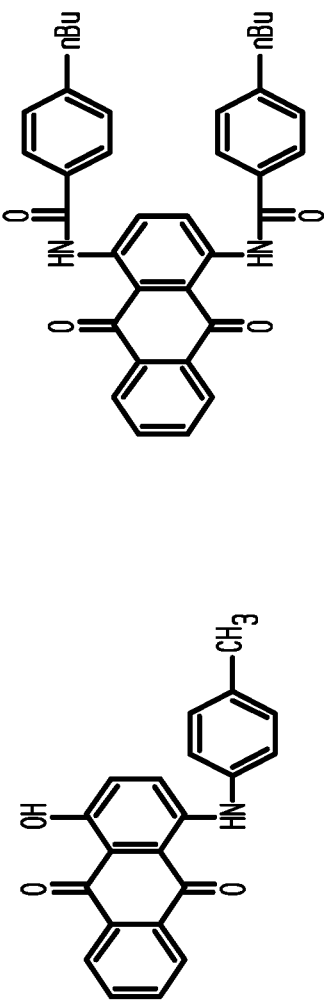
FIG. 11 shows one example each of positive and negative linear dichroic dyes suitable for doping Ch-GLC films.

FIG. 11 shows two example of linear dichroic dyes for doping Ch-GCL films—an example of a positive linear dichroic dye and an example of a negative linear dichroic dye. Other dies with similar properties can be used.

Figure 12:
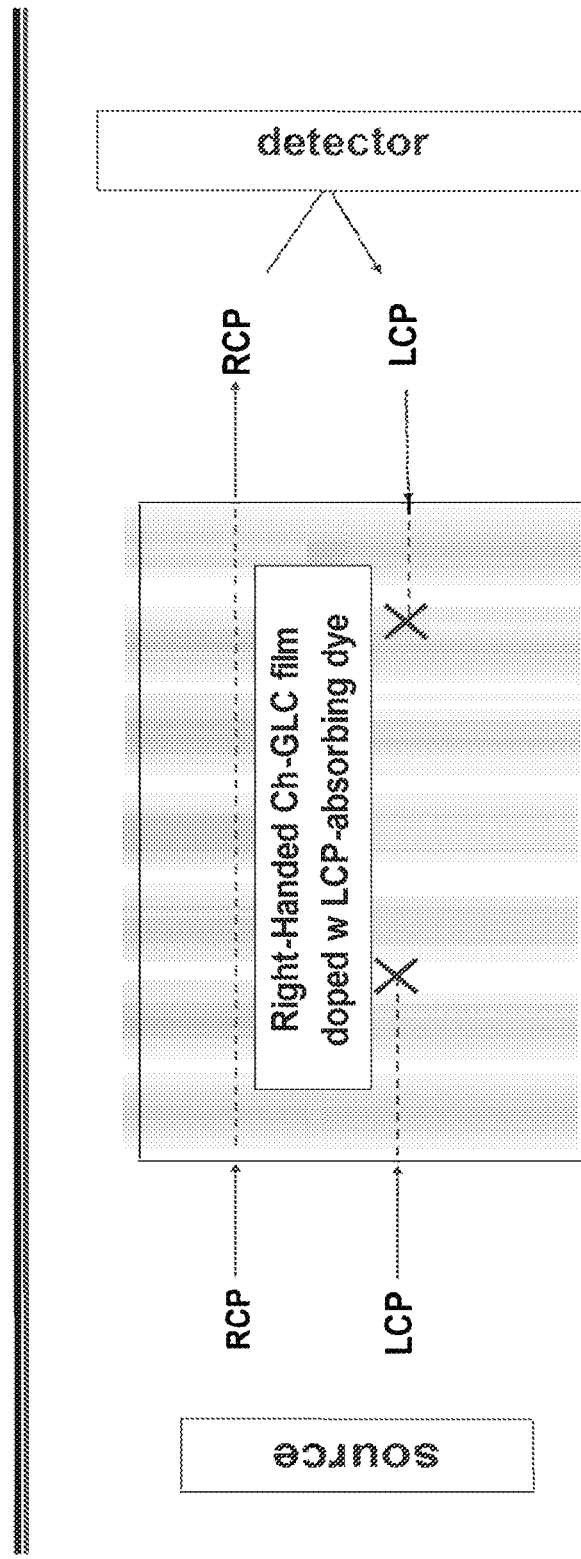
FIG. 12 illustrates a right-handed Ch-GLC film doped with a LCP-absorbing dichroic dye. The RCP component passes through the doped film to reach the detector, but the LCP component is attenuated both in the forward and in the backward direction. In this example, $\lambda_{SB} = \lambda_{ABS}$ and LD>or <0.

FIG. 12 is otherwise like FIG. 9 but illustrates a right-handed Ch-GLC film doped with a LCP-absorbing dichroic dye. The RCP component passes through the doped film to reach the detector, but the LCP component is attenuated both in the forward and in the backward direction. In this example, $\lambda_{SB}=\lambda_{ABS}$ and LD> or <0.

An important discovery is that the Ch-GLC material in the doped film discussed above can be the compositions described in U.S. Pat. No. 7,001,648 B, which is hereby incorporated by reference. A specific example of a suitable material has been described in said patent as a glassy chiral-nematic liquid crystal composition comprising a compound having a 1,3,5-benzenetricarbonyl central moiety, said composition being characterized by a morphologically stable cholesteric phase and said compound having the structural formula

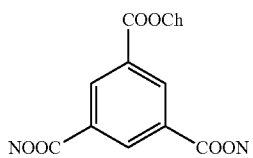

wherein each N represents a nematic group connected to said central moiety by a carboxylic ester linkage and Ch represents a chiral group connected to said central moiety by a carboxylic ester linkage, and variations thereof are identified in the claims of the patent and the remainder of the patent specification.

While preferred embodiments have been shown and described herein, it will be apparent to those skilled in the art that such embodiments are provided by way of example only. Numerous variations, changes, and substitutions will now occur to those skilled in the art without departing from the invention. Various alternatives to the embodiments of the invention described herein may be employed in practicing the invention. It is intended that the following claims define the scope of the invention and that methods and structures within the scope of these claims and their equivalents be covered thereby.

The invention claimed is:

1. An optical device comprising:
a cholesteric glassy liquid crystal film doped with a dye, wherein said film:
preferentially absorbs a forward component of light incident on the film that is circularly polarized with handedness in a first direction as well as any backward component of the incident light that is circularly polarized with handedness in said first direction and has been reflected after passage through the doped film; and
preferentially passes through the doped film a forward component of the incident light that is circularly polarized with handedness in a second direction that is different from the first direction.

2. The optical device of claim 1, in which the film has absorption and stop band ranges that overlap in wavelength.

3. The optical device of claim 2, in which the film is doped with a positive or negative dichroic dye.

4. The optical device of claim 3 that also includes an anti-reflective coating on the device configured to further reduce reflected light.

5. The optical device of claim 4, in which an isolation ratio of the optical device is in a range of 10 to 500.

6. The optical device of claim 3, in which an isolation ratio of the optical device is in a range of 10 to 500.

7. The optical device of claim 1, in which the film has absorption and stop band ranges spaced from each other in wavelength.

8. The optical device of claim 7, in which the absorption band is at a shorter wavelength range than the stop band.

9. The optical device of claim 7, in which the absorption band is at a longer wavelength range than the stop band.

10. The optical device of claim 1, in which the film comprises a monodomain cholesteric liquid crystal.

11. The optical device of claim 10, in which the film is doped with a dye configured to preferentially absorb components of incident light depending on handedness of said components.

12. The optical device of claim 11 that also includes an anti-reflective coating to further reduce incident light reflected by the device.

13. The optical device of claim 12, in which an isolation ratio of the optical device is in a range of 10 to 500.

14. The optical device of claim 11, in which an isolation ratio of the optical device is in a range of 10 to 500.

15. The optical device of claim 1 that further includes a receiving surface at a first side of said film, receiving light passed by said film, wherein said film preferentially absorbs light reflected by said first surface that is circularly polarized with handedness in said first direction.

16. The optical device of claim 15, in which the film has absorption and stop band ranges that overlap in wavelength.

17. The optical device of claim 16, in which the film is doped with a linear dichroic dye represented by

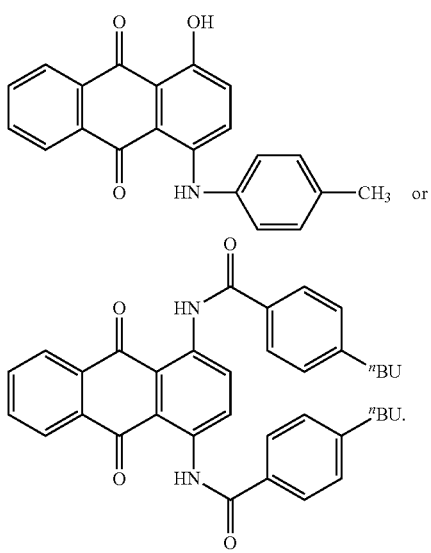

18. The optical device of claim 17, in which an isolation ratio of the optical device is in a range of 10 to 500.

19. The optical device of claim 15, in which an isolation ratio of the optical device is in a range of 10 to 500.

20. The optical device of claim 15, in which the film has absorption and stop band ranges spaced from each other in wavelength.

21. The optical device of claim 20, in which the absorption band is at a shorter wavelength range than the stop band.

22. The optical device of claim 21, in which the absorption band is at a longer wavelength range than the stop band.

23. The optical device of claim 15, in which the film comprises a monodomain cholesteric liquid crystal.

24. The optical device of claim 23 that also includes an anti-reflective coating to further reduce reflected light.

25. The optical device of claim 24, in which an isolation ratio of the optical device is in a range of 10 to 500.

26. The optical device of claim 1, in which the liquid crystal film comprises a glassy chiral-nematic liquid crystal composition comprising a compound having a 1, 3, 5-benzenetricarbonyl central moiety, said composition being characterized by a morphologically stable cholesteric phase and said compound having the structural formula

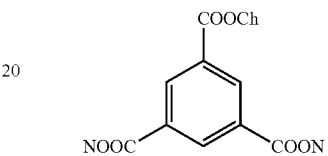

wherein each N represents a nematic group connected to said central moiety by a carboxylic ester linkage and Ch represents a chiral group connected to said central moiety by a carboxylic ester linkage, and variations thereof are identified in the claims of the patent and the remainder of the patent specification.

* * * * *